H. R. UNDERHILL.
Manufacture of Horse-Shoe Nails.
No. 134,448.                      Patented Dec. 31, 1872.
*Fig. 1.*    *Fig. 2.*        *Fig. 3.*    *Fig. 4.*
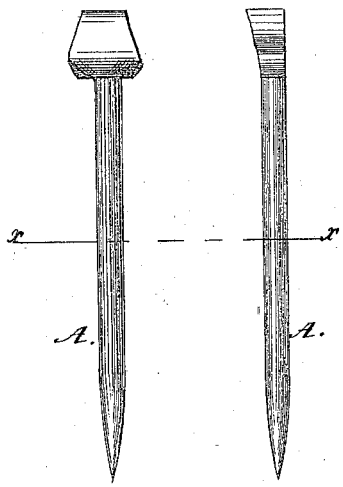
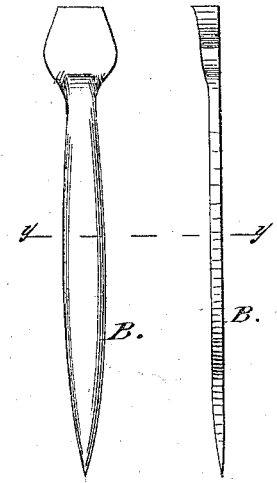
*Fig. 5.*           *Fig. 6.*
Witnesses:                        Inventor:
                                        H. R. Underhill
                               PER                    
                                        Attorneys.
AM. PHOTO-LITHOGRAPHIC CO. N.Y. (OSBORNE'S PROCESS.)

UNITED STATES PATENT OFFICE.

HAZEN R. UNDERHILL, OF DERRY, NEW HAMPSHIRE.

IMPROVEMENT IN THE MANUFACTURE OF HORSESHOE-NAILS.

Specification forming part of Letters Patent No. 134,448, dated December 31, 1872.

*To all whom it may concern:*

Be it known that I, HAZEN R. UNDERHILL, of Derry, in the county of Rockingham and State of New Hampshire, have invented a new and useful Improvement in Horseshoe-Nails, of which the following is a specification:

Figure 1 is a side view of a nail rounded or half made. Fig. 2 is an edge view of the same. Fig. 3 is a side view of the completed nail. Fig. 4 is an edge view of the same. Fig. 5 is a cross-section taken through the line $x\,x$, Figs. 1 and 2. Fig. 6 is a cross-section taken through the line $y\,y$, Figs. 3 and 4.

My invention has for its object to furnish improved horseshoe-shoe nails stiffer, smoother, and more uniform than nails made in the ordinary manner, being thus more readily driven and less liable to injure the hoof, and which shall at the same time be no more expensive; and it consists in the mode of forming horseshoe-nails, hereinafter described—that is to say, by rolling, forging, or swaging them into round form, and then flattening them with a drop-hammer; and in the horseshoe-nails made with rounded edges and flat sides, as hereinafter more fully described.

A represents a nail which has been rolled, forged, or swaged into a round form, as shown in Figs. 1, 2, and 5. In this way the nails are made smooth and uniform. The round nails A are then, when cold, with one blow of a drop-hammer, flattened to the required flatness. By this mode of manufacture the nails B are made with flattened sides and rounded edges, as shown in Figs. 3, 4, and 6.

Nails thus made are smoother, stiffer, more uniform, more easily driven, and less liable to crack or otherwise injure the hoof than nails made in the ordinary manner.

Having thus described my invention, I claim as new and desire to secure by Letters Patent—

1. The mode of forming horseshoe-nails herein described—that is to say, by rolling, forging, or swaging them into round form, and then flattening them with a drop-hammer.

2. Horseshoe-nails made with round edges and flat sides, substantially as herein shown and described, and for the purposes set forth.

HAZEN R. UNDERHILL.

Witnesses:
JOHN L. LOVETT,
GEO. I. HUBBARD.